United States Patent
Dammann et al.

(10) Patent No.: US 7,523,378 B2
(45) Date of Patent: Apr. 21, 2009

(54) TECHNIQUES TO DETERMINE INTEGRITY OF INFORMATION

(75) Inventors: Ronald L. Dammann, Palo Alto, CA (US); Steven R. King, Portland, OR (US); Frank L. Berry, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 11/233,742

(22) Filed: Sep. 23, 2005

(65) Prior Publication Data

US 2007/0074092 A1   Mar. 29, 2007

(51) Int. Cl.
*H03M 13/00* (2006.01)
(52) U.S. Cl. ...................................... 714/758
(58) Field of Classification Search ................. 714/746, 714/758
See application file for complete search history.

(56) References Cited

U.S. PATENT DOCUMENTS 7,246,275 B2 * 7/2007 Therrien et al. ............. 714/710
7,353,299 B2 * 4/2008 Hattrup et al. ............... 710/30
2006/0114909 A1 * 6/2006 Uzrad-Nali et al. ......... 370/394

OTHER PUBLICATIONS

Abhijeet Joglekar et al., U.S. Appl. No. 11/115,656 entitled "Techniques to Provide Information Validation and Transfer," filed Apr. 26, 2005.
Steven R. King et al., U.S. Appl. No. 11/230,720 entitled "Techniques to Perform Prefetching of Content in Connection with Integrity Validation Value Determination," filed Sep. 19, 2005.

* cited by examiner

*Primary Examiner*—Shelly A Chase
(74) *Attorney, Agent, or Firm*—Caven & Aghevli LLC (57) ABSTRACT

Techniques are described herein that may utilize capabilities of a data mover in order to determine an integrity validation value or perform an integrity checking operation. The integrity validation value determination and integrity checking operations may be controlled by descriptors or instructions. In some implementations, integrity validation value determination and the integrity checking operations may include determination of a cyclical redundancy checking (CRC) value.

24 Claims, 9 Drawing Sheets

FIG. 1

| Descriptor type |
|---|
| Starting address of buffer over which to determine CRC |
| Size of buffer over which to determine CRC value |
| CRC seed value |
| Address from which to retrieve seed value |
| Address in which to store accumulated CRC value |
| Address from which to retrieve comparison value |
| Flag |
| Next descriptor field |

TECHNIQUES TO DETERMINE INTEGRITY OF INFORMATION

FIELD

The subject matter disclosed herein relates to techniques to determine integrity of information.

RELATED ART

Data communications systems typically utilize techniques to verify the integrity of received information. For example, to verify integrity of received packets, various protocols such as Remote Direct Memory Access (RDMA), Internet Small Computer System Interface (iSCSI), and Stream Control Transmission Protocol (SCTP) may use a calculation of cyclical redundancy checking (CRC) values over received packets as well as a comparison of calculated CRC values with CRC values provided with the packets. For example, RDMA is described for example at www.rdmaconsortium.com as well as in An RDMA Protocol Specification, Version 1.0 (October 2002). iSCSI is described for example at RFC 3720: Internet Small Computer Systems Interface (iSCSI) (April 2004). SCTP is described for example at The Internet Society RFC-3286, An Introduction to the Stream Control Transmission Protocol (SCTP) (May 2002).

BRIEF DESCRIPTION OF THE DRAWINGS

Embodiments of the present invention are illustrated by way of example, and not by way of limitation, in the figures of the accompanying drawings and in which like reference numerals refer to similar elements and in which.

Note that use of the same reference numbers in different figures indicates the same or like elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
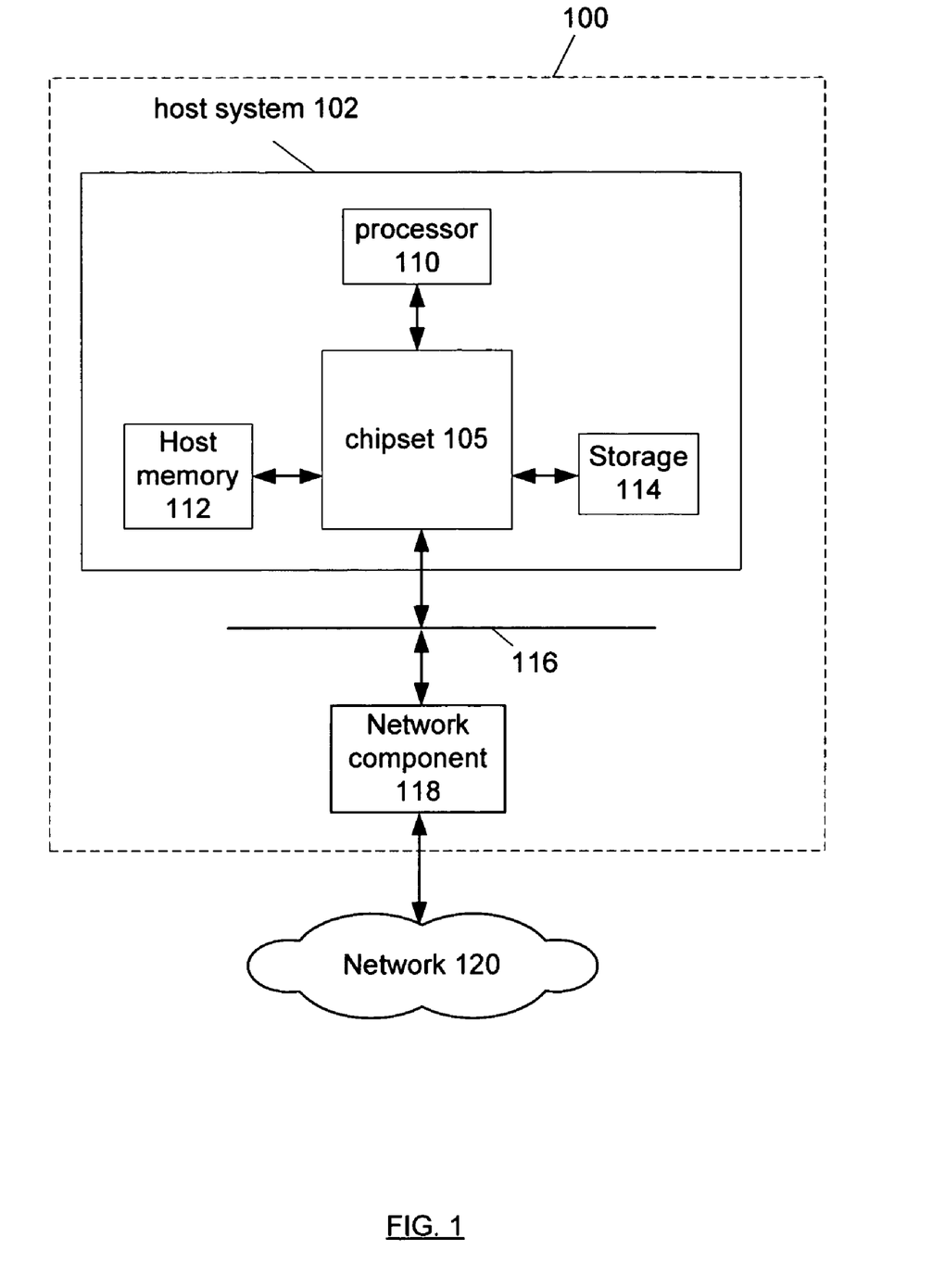
FIG. 1 depicts an example computer system capable to use embodiments of the present invention.

FIG. 1 depicts in block diagram form a computer system 100. Computer system 100 is a suitable system in which some embodiments of the present invention may be used. Computer system 100 may include host system 102, bus 116, and network component 118.

Host system 102 may include chipset 105, processor 110, host memory 112, and storage 114. Chipset 105 may provide intercommunication among processor 110, host memory 112, storage 114, bus 116, as well as a graphics adapter that can be used for transmission of graphics and information for display on a display device (both not depicted). For example, chipset 105 may include a storage adapter (not depicted) capable of providing intercommunication with storage 114. For example, the storage adapter may be capable of communicating with storage 114 in conformance with any of the following protocols: Small Computer Systems Interface (SCSI), Fibre Channel (FC), and/or Serial Advanced Technology Attachment (S-ATA).

In some embodiments, chipset 105 may include data mover logic to perform transfers of information within host memory, from host memory to host system, within host system, or from host system to host memory. As used herein, a "data mover" refers to a module for moving data from a source to a destination without using the core processing module of a host processor, such as processor 110, or otherwise does not use cycles of a processor to perform data copy or move operations. By using the data mover for transfer of data, the processor may be freed from the overhead of performing data movements. A data mover may include, for example, a direct memory access (DMA) engine as described herein. In some embodiments, data mover could be implemented as part of processor 110, although other components of computer system 100 may include the data mover.

Some embodiments of the present invention may utilize a retrieve capability of a data mover at least to retrieve information over which to generate an integrity validation value. Integrity validation value determination logic (not shown) may be used to determine an integrity validation value. For example, an integrity validation value determination operation may include a determination of a checksum, determination of a cyclical redundancy checking (CRC) value, or determination of another integrity validation value based on one or more portion of the information. In some embodiments, the store capability of the data mover logic is used at least to store the determined integrity validation values into memory.

In some embodiments, integrity validation value determination logic and/or validity checking decision logic may be in the same logic as the data mover logic. In some embodiments, integrity validation value determination logic and/or validity checking decision logic may be implemented in a separate logic from the data mover logic. In some embodiments, instructions may be provided to integrity validation value determination logic, validity checking decision logic, and/or data mover logic to command operations.

In some embodiments, integrity validation value determination logic may be used to generate integrity validation values for one or more network protocol unit that is to be transmitted and over which an integrity check may be conducted by a receiver of such one or more network protocol unit. As used herein, a "network protocol unit" may include any packet or frame or other format of information with a header and payload portions formed in accordance with any protocol specification.

In some embodiments, integrity checking logic (not shown) may perform checks of integrity of one or more network protocol units received from a sender. For example, the one or more network protocol units may have been transmitted through a network. In some embodiments, integrity checking logic may include the capability to halt and continue integrity checking operations. For example, to halt an integrity checking operation, the current determination of the integrity validation value may be stored and available for use later. To continue the integrity checking operation, a stored integrity validation value may be retrieved and used in integrity checking operations. Accordingly, CRC validations or other determinations may take place without use of a processor. Thereby, resources of the processor may be freed for other uses. In some embodiments, the retrieve capability of the data mover logic is used to retrieve the stored integrity validation value.

Processor 110 may be implemented as Complex Instruction Set Computer (CISC) or Reduced Instruction Set Computer (RISC) processors, multi-core, or any other microprocessor or central processing unit. Host memory 112 may be implemented as a volatile memory device such as but not limited to a Random Access Memory (RAM), Dynamic Random Access Memory (DRAM), or Static RAM (SRAM). Storage 114 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Bus 116 may provide intercommunication among at least host system 102 and network component 118 as well as other peripheral devices (not depicted). Bus 116 may support serial or parallel communications. Bus 116 may support node-to-node or node-to-multi-node communications. Bus 116 may be compatible with Peripheral Component Interconnect (PCI) described for example at Peripheral Component Interconnect (PCI) Local Bus Specification, Revision 2.2, Dec. 18, 1998 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.0a, Jul. 24, 2000, available from the aforesaid PCI Special Interest Group, Portland, Oreg., U.S.A. (as well as revisions thereof); and/or Universal Serial Bus (USB) (and related standards) as well as other interconnection standards.

Network component 118 may be capable of providing intercommunication between host system 102 and network 120 in compliance with any applicable protocols. Network component 118 may intercommunicate with host system 102 using bus 116. In one embodiment, network component 118 may be integrated into chipset 105. "Network component" may include any combination of digital and/or analog hardware and/or software on an I/O (input/output) subsystem that may process one or more network protocol units to be transmitted and/or received over a network. In one embodiment, the I/O subsystem may include, for example, a network component card (NIC), and network component may include, for example, a MAC (media access control) layer of the Data Link Layer as defined in the Open System Interconnection (OSI) model for networking protocols. The OSI model is defined by the International Organization for Standardization (ISO) located at 1 rue de Varembé, Case postale 56 CH-1211 Geneva 20, Switzerland.

In some embodiments, integrity validation value determination logic, integrity checking logic, and/or data mover logic may be implemented in the same integrated circuit as network component 118. In some embodiments, integrity validation value determination logic, integrity checking logic, and/or data mover logic may be implemented in a different integrated circuit from network component 118.

Network 120 may be any network such as the Internet, an intranet, a local area network (LAN), storage area network (SAN), a wide area network (WAN), or wireless network. Network 120 may exchange traffic with network component 118 using the Ethernet standard (described in IEEE 802.3 and related standards) or any communications standard.

Figure 2:
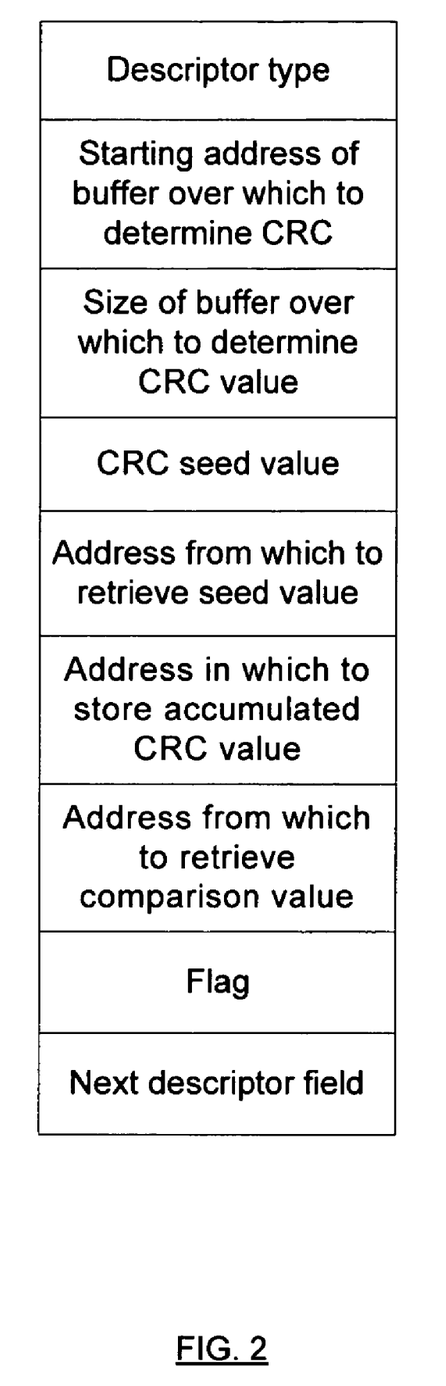
FIG. 2 depicts an example format of descriptors that can be used at least to request determinations of validation values, in accordance with some embodiments of the present invention.

FIG. 2 depicts an example format of descriptors that can be used to at least request determination of an integrity validation value, in accordance with some embodiments of the present invention. In some embodiments, descriptors may be used to command operations of integrity validation value determination logic, validity checking decision logic, and/or a data mover. In some embodiments, a data mover driver executed by a processor may create descriptors, although the descriptors may be generated by other sources.

For example, in some embodiments, at least three different descriptor types may be used. In a first type, the descriptor commands a determination of a CRC value (or other integrity validation value) over contents of a specified buffer. In a second type, the descriptor commands a determination of a CRC value (or other integrity validation value) over contents of a specified buffer and a comparison of the determined CRC value with a comparison value from a specified location. In a third type, the descriptor commands a determination of a CRC value (or other integrity validation value) over contents of a specified buffer and storage of the accumulated determined CRC value. In some embodiments, determination of an integrity validation value other than a CRC value may be performed over the specified buffer such as but not limited to a checksum or other integrity validation value determination over one or more portions of the specified buffer. In each of the first, second, and third types of descriptors, a retrieve operation of the data mover may be used to retrieve at least some of the contents of the specified buffer. In the second type of descriptor, a retrieve operation of the data mover may be used to retrieve the comparison value from a specified location. In the third type of descriptor, a store operation of the data mover may be used to store the CRC value (or other value).

Multiple descriptors may be specified, such that a single logical CRC operation takes place over discontinuous buffers. A "seed" value may be specified to set the starting value used in a CRC value determination. The seed value may permit a CRC determination operation (or other operation) to resume using an intermediate CRC value previously determined on a partial data set.

In some embodiments, descriptors may include fields described for example in the following table.

| Field Name | Non-limiting Brief Description |
| --- | --- |
| Descriptor type | Determine integrity validation value, determine and store integrity validation value, or determine and compare integrity validation value with reference value. |
| Starting address of buffer over which to determine CRC value | Location of memory over which to determine a CRC value (or other integrity validation value). |
| Size of buffer over which to determine CRC value | Size of contents of memory over which to determine a CRC value (or other integrity validation value). |
| CRC seed value | Starting value to use in determination of CRC value (or other integrity validation value). |
| Address from which to retrieve seed value | Starting address in host memory from which to retrieve a starting value to use in determination of CRC value (or other integrity validation value). |
| Address in which to store accumulated CRC value | Starting address in host memory in which to store determined CRC value |

-continued

| Field Name | Non-limiting Brief Description |
| --- | --- |
| | (or other integrity validation value). In some implementations, this address may be appended to the buffer over which to determine a CRC value (or other integrity validation value). |
| Address from which to retrieve comparison value | Starting address from which to retrieve a value for comparison with determined CRC value (or other integrity validation value). In some implementations, this address may be appended to the buffer over which to determine a CRC value (or other integrity validation value). |
| Flag indicating relevant address in buffer over which to determine a CRC value | Indicates whether an address of stored determined CRC value (or other integrity validation value) or address from which to retrieve a comparison value is at end of (or within) buffer over which to determine a CRC (or other integrity validation value). |
| Next descriptor field | Points to next descriptor in a chain. |

Figure 3:
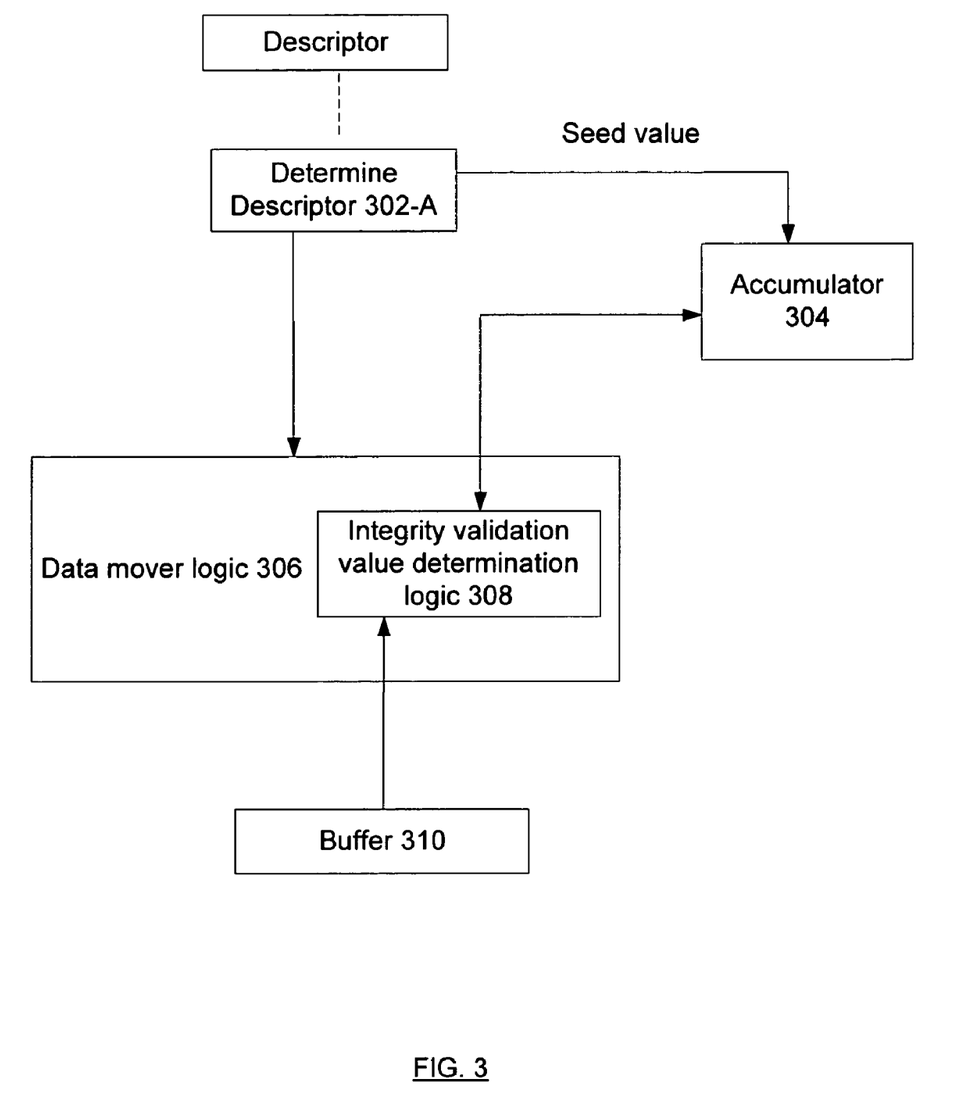
FIGS. 3-5 provides in block diagram form example executions of descriptors, in accordance with some embodiments of the present invention.

FIG. 3 provides in block diagram form an example of an execution of a determine descriptor 302-A, in accordance with some embodiments of the present invention. For example, execution of a determine descriptor 302-A may be followed by execution of another descriptor. For example, descriptors which follow the determine descriptor may include another determine descriptor, a validation test, or a validation value store descriptor. For example, determine descriptor 302-A may be utilized prior to transmission of a network protocol unit (e.g., to generate CRC value for the network protocol unit) or following receipt of a network protocol unit (e.g., to determine a CRC value of a network protocol unit that can be used to verify integrity of the received network protocol unit). Of course, in other embodiments, values other than a CRC value may be determined over a portion of the information, such as but not limited to a checksum.

In the execution of determine descriptor 302-A, a retrieve operation of data mover logic 306 may be used to retrieve information over which a CRC value is to be determined. In some embodiments, determine descriptor 302-A provides a seed value for accumulator 304. In some embodiments, the seed value may be retrieved from buffer 310. Accumulator 304 may be implemented as any memory or storage device capable to store information. The seed value could be a default start value or value from previous integrity validation value determination operation. For example, the seed value may be a CRC value determined using a previous determine descriptor, although other values may be used. Accumulator 304 may provide a seed value to integrity validation value determination logic 308 for use as a starting value by which to determine an integrity validation value over at least a portion of the information stored in buffer 310. Integrity validation value determination logic 308 may use accumulator 304 to store a determined CRC value.

Any techniques may be used to determine a CRC value such as but not limited to that described as CRC32C with generator polynomial 0x11EDC6F41 in RFC 3720—Internet Small Computer Systems Interface (iSCSI) (2004). In some embodiments, integrity validation value determination logic 308 could implement one or more different CRC polynomials, checksums, or other validation value determination techniques to determine the CRC value. If an embodiment supports multiple validation value determination techniques, a field may be included in the descriptor 302-A to instruct the integrity validation value determination logic 308 which technique to use. In some embodiments, determination of a CRC value may use table lookup and arithmetic-logic-unit operations in an instruction repeated in a loop. In some embodiments, determination of a CRC value may include calculations and/or uses of look-up-tables.

Figure 4:
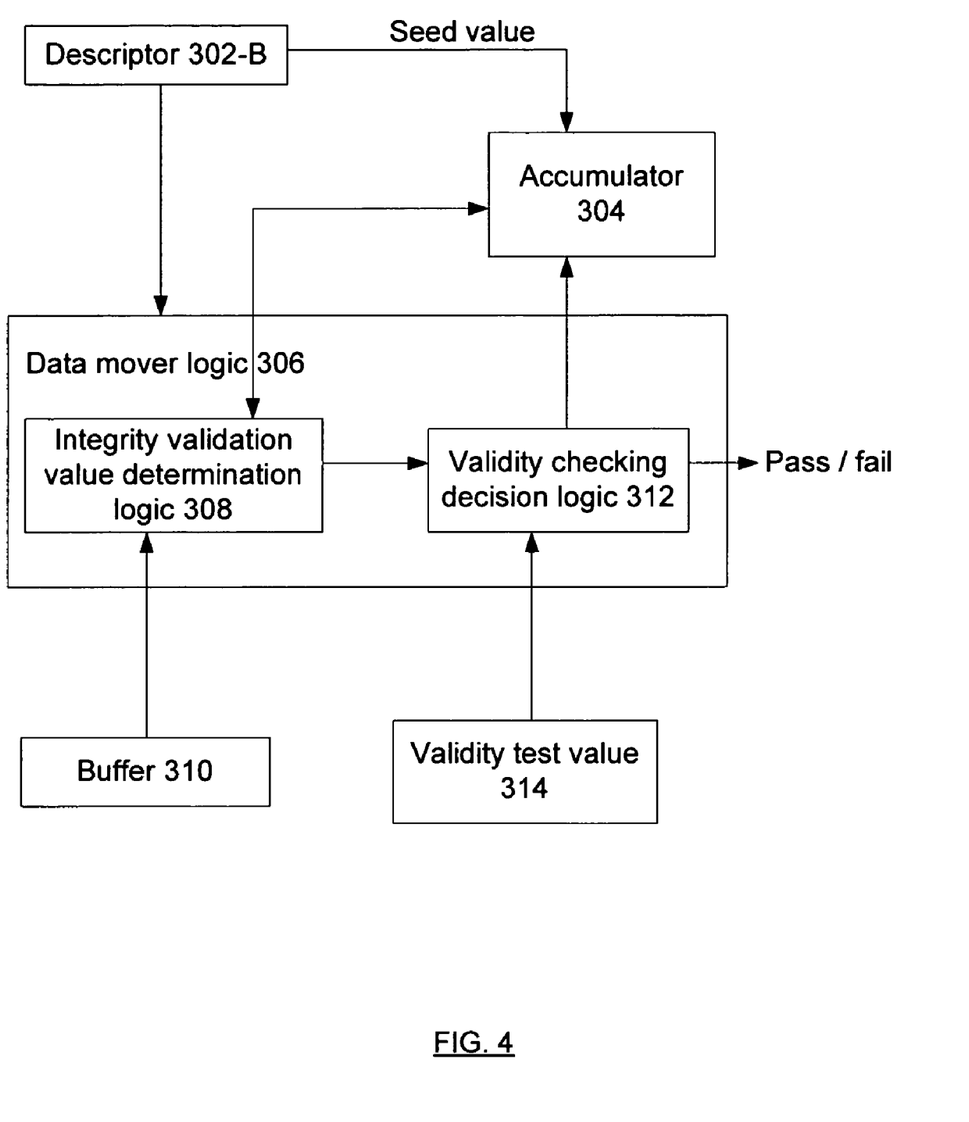

FIG. 4 provides in block diagram form an example of an execution of a validation test descriptor 302-B, in accordance with some embodiments of the present invention. For example, validation test descriptor 302-B may be utilized following receipt of a network protocol unit, although validation test descriptor 302-B may be utilized in other scenarios.

In this example, validation test descriptor 302-B provides at least (1) an address from which to read a comparison value, (2) an address from which to read information over which a CRC value is to be determined, (3) the size of information over which a CRC value is to be determined, and (4) a seed value for accumulator 304. The seed value could be a default start value or value from previous integrity checking operation or may be a default start value for commencement of an integrity checking operation. In some embodiments, validation test descriptor 302-B specifies that operations other than a CRC value determination are performed such as but not limited to a checksum or any determination using any portion of information. In some embodiments, an address from which to read a CRC comparison value may be provided following the information over which a CRC value is to be determined.

In the execution of validation test descriptor 302-B, a retrieve operation of data mover logic 306 may be used to retrieve information over which a CRC value is to be determined. Integrity validation value determination logic 308 may utilize the seed value in accumulator 304 to determine the CRC value over the information identified by validation test descriptor 302-B. In some embodiments, the seed value from validation test descriptor 302-B may be provided to accumulator 304. In some embodiments, the seed value may be retrieved from buffer 310. Integrity validation value determination logic 308 may utilize accumulator 304 to store intermediate and final results of CRC value determinations.

Any techniques may be used to determine a CRC value such as but not limited to that described as CRC32C with generator polynomial 0x11EDC6F41 in RFC 3720—Internet Small Computer Systems Interface (iSCSI) (2004). In some embodiments, integrity validation value determination logic 308 could implement one or more different CRC polynomials, checksums, or other validation value determination techniques to determine the CRC value. If an embodiment supports multiple validation value determination techniques, a field may be included in the descriptor 302-A to instruct the integrity validation value determination logic 308 which technique to use. In some embodiments, determination of a CRC value may use table lookup and arithmetic-logic-unit operations in an instruction repeated in a loop. In some embodiments, determination of a CRC value may include calculations and/or uses of look-up-tables.

validity checking decision logic 312 may compare the determined integrity validation value (e.g., CRC value) with the CRC comparison value read from a memory location specified by validation test descriptor 302-B (such memory location is shown as "validity test value 314"). In some implementations, instead of including a memory location from which to read the CRC comparison value, validation test descriptor 302-B may indicate that the CRC comparison value is to be read from the end of the buffer over which to determine a CRC value (i.e., buffer 310). In some embodiments, a retrieve operation of the data mover may be used to retrieve the comparison value. In some embodiments, validity checking decision logic 312 may be implemented as a comparator. In some embodiments, where the information over which a CRC value determination is performed includes at least one network protocol unit, the CRC comparison value may a CRC value provided with the network protocol unit.

If the determined CRC value matches the CRC comparison value, then in one embodiment, a next descriptor may be processed and the information over which the CRC determination took place may be available for use. For example, the information may be a network protocol unit received from a network and after successful CRC value determination, the information is available for use for example by an application If the determined CRC value does not match the CRC value read from a memory location specified by validation test descriptor 302-B, then in one embodiment, host intervention may take place. Host intervention may include performing error recovery in accordance with TCP/IP. For example, error recovery may include requesting the sender to resend a network protocol unit or aborting the network connection after requests to resend one or more network protocol unit do not result in successful CRC validation of the resent one or more network protocol unit.

In some embodiments, execution of a validation test descriptor 302-B includes techniques described in RFC 3720 such as, but not limited to: (1) determining a CRC value (or other integrity validation value) over an identified buffer, (2) reading a validity comparison value and continuing to determine the CRC value (or other value) using the validity comparison value, and (3) comparing the accumulated CRC value (or other value) with a fixed reference CRC remainder value. The data mover may be used to retrieve the validity comparison value. Other techniques may be used to determine CRC values.

Figure 5:
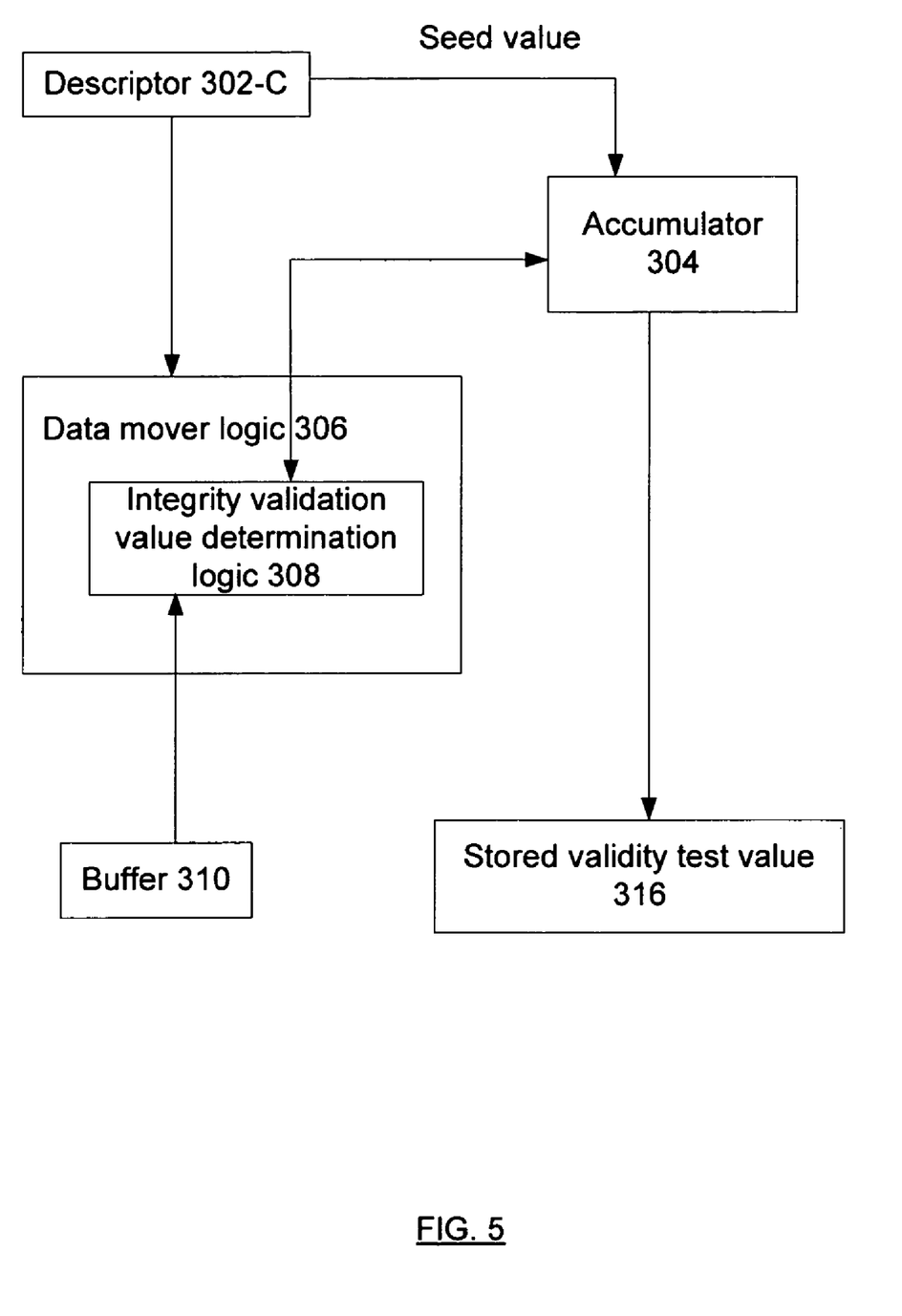

FIG. 5 provides in block diagram form an example of an execution of validation value store descriptor 302-C, in accordance with some embodiments of the present invention. For example, validation value store descriptor 302-C may be utilized prior to transmission of one or more network protocol units (e.g., to generate CRC value for the one or more network protocol units) or following receipt of one or more network protocol units (e.g., to generate a CRC value of one or more network protocol units that can be used to verify integrity of the one or more network protocol units).

In this example, validation value store descriptor 302-C provides at least (1) an address from which to read information over which a CRC value is to be determined, (2) the size of information over which a CRC value is to be determined, (3) a seed value for accumulator 304, and (4) a starting address at which to store an accumulated CRC value (the storage of the accumulated CRC value is shown as "stored validity test value 316"). The seed value could be a default start value or value from previous integrity value determination operation or may be a default start value for commencement of an integrity checking operation. For example, the seed value may be a CRC value determined using a previous determine descriptor, although other values may be used. In other embodiments, validation value store descriptor 302-C specifies that operations other than a CRC value determination are performed such as but not limited to a checksum or any value determination using any portion of information. In some implementations, instead of including a memory location in which to store stored validity test value 316, validation value store descriptor 302-C may indicate that the stored validity test value 316 is to be stored at the end of the buffer over which to determine a CRC value (i.e., buffer 310).

In the execution of validation value store descriptor 302-C, a retrieve operation of data mover logic 306 may be used to retrieve information over which a CRC value is to be determined. In some embodiments, validation value store descriptor 302-C may provide a seed value for accumulator 304. In some embodiments, the seed value may be retrieved from buffer 310. Accumulator 304 may be implemented as any memory or storage device capable to store information. Accumulator 304 may provide a seed value to integrity validation value determination logic 308 for use as a starting value by which to determine an integrity validation value over at least a portion of the information stored in buffer 310. Integrity validation value determination logic 308 may use accumulator 304 to store CRC value or other validation checking values. Following completion of determining the CRC value or determination of other validation checking values, the integrity validation value may be stored as stored validity test value 316. In some embodiments, the data mover may be used to store the CRC value or other validation checking value.

Any techniques may be used to determine a CRC value such as but not limited to that described as CRC32C with generator polynomial 0x11EDC6F41 in RFC 3720—Internet Small Computer Systems Interface (iSCSI) (2004). In some embodiments, integrity validation value determination logic 308 could implement one or more different CRC polynomials, checksums, or other validation value determination techniques to determine the CRC value. If an embodiment supports multiple validation value determination techniques, a field may be included in the descriptor 302-A to instruct the integrity validation value determination logic 308 which technique to use. In some embodiments, determination of a CRC value may use table lookup and arithmetic-logic-unit operations in an instruction repeated in a loop. In some embodiments, determination of a CRC value may include calculations and/or uses of look-up-tables.

For example, the stored CRC value determination state may be used as a CRC value to be transmitted with a network protocol unit. For example, a CRC value determination state may be used in subsequent CRC operations to continue CRC value determinations. To continue a CRC value determination, the CRC value state may be copied into a descriptor and the CRC value state be copied into an accumulator.

Figure 6:
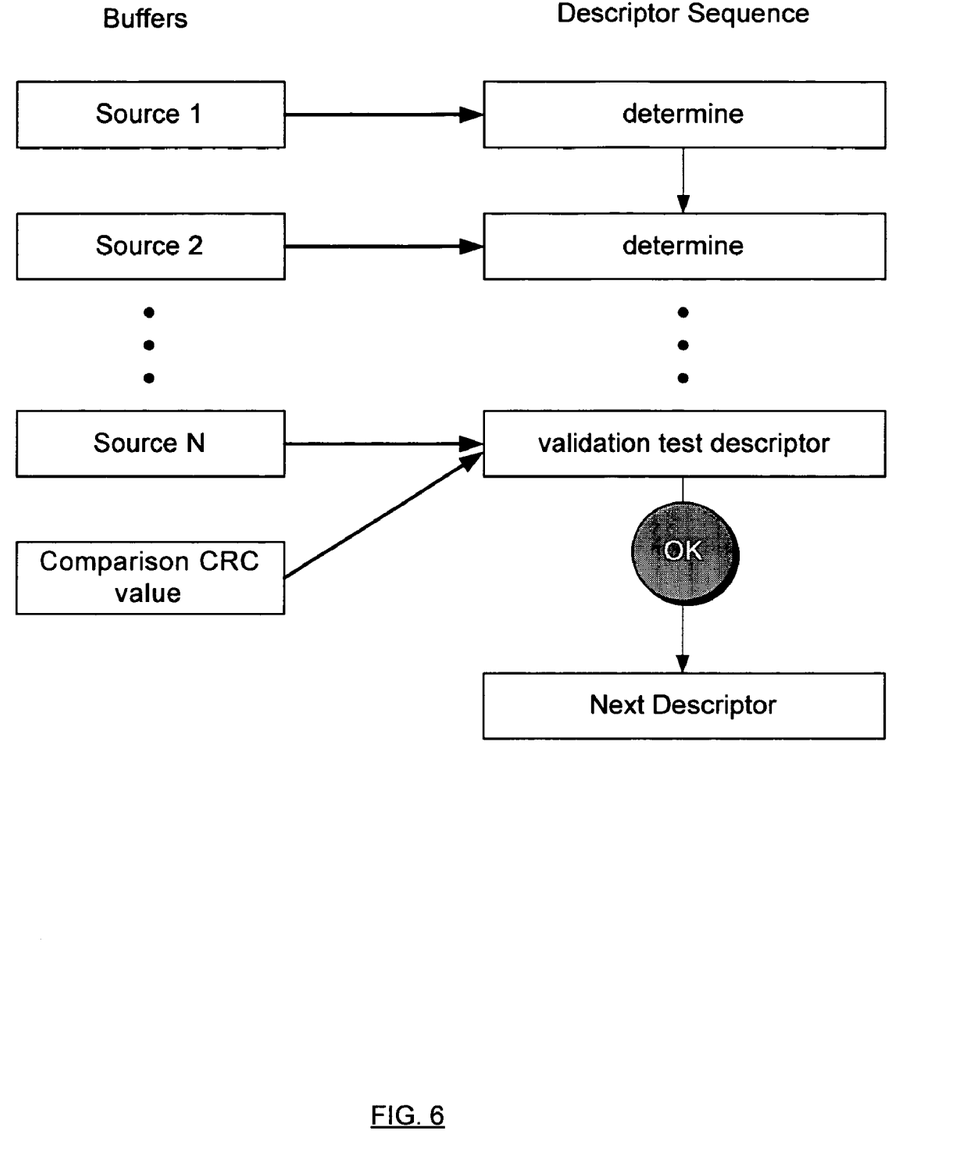
FIGS. 6-8 provide example executions of sequences of descriptors, in accordance with some embodiments of the present invention.
Figure 7:
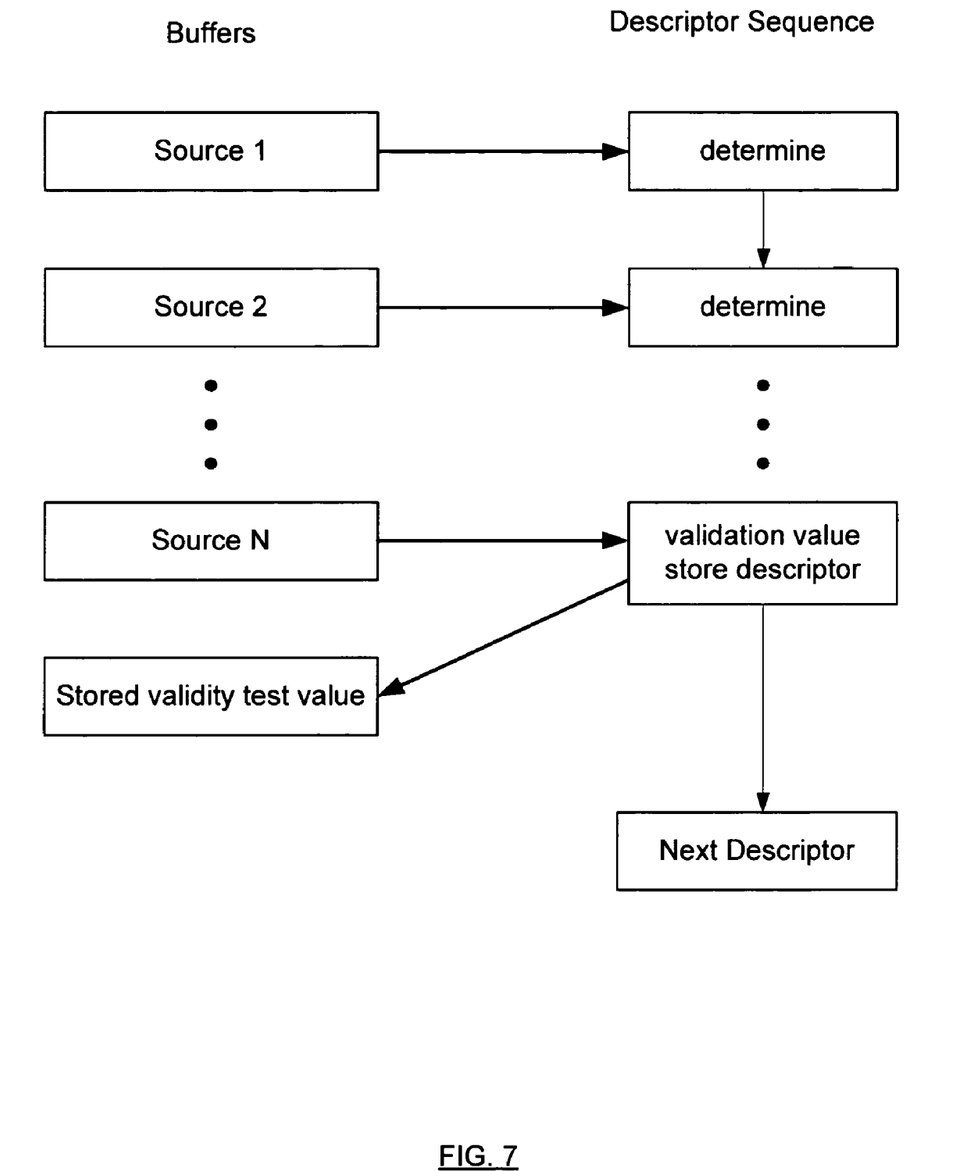
Figure 8:
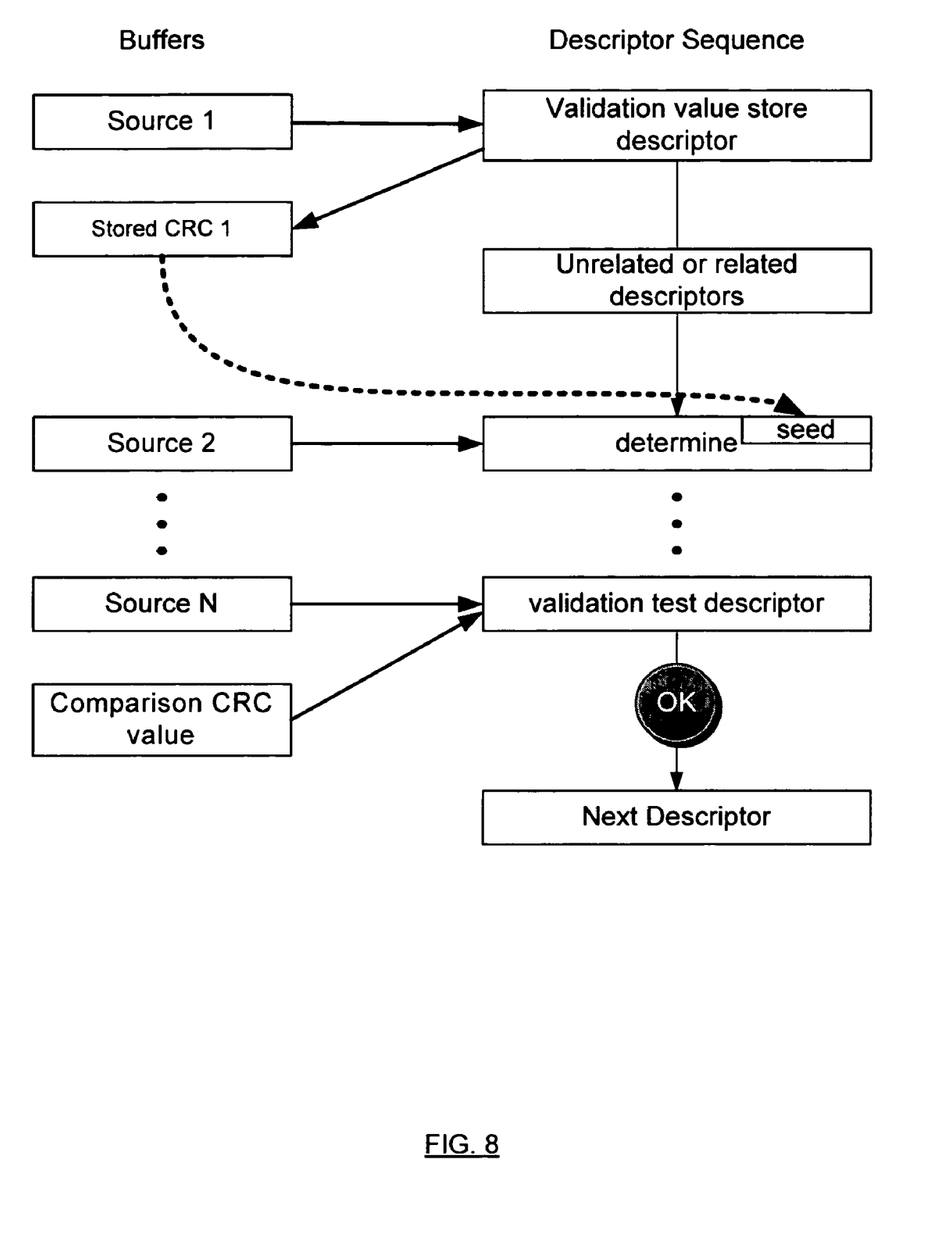

FIGS. 6-8 provide example executions of sequences of descriptors, in accordance with some embodiments of the present invention. For example, FIG. 6 depicts execution of multiple determine descriptors followed by execution of a validation test descriptor. For example, execution of each determine descriptor may include loading a CRC value provided with each determine descriptor into an accumulator for use as a starting value for a CRC value determination over buffer contents specified by each determine descriptor. In this example, the buffer contents and the seed CRC value specified for each determine descriptor may be different. In this example, a retrieve capability of a data mover may be used to retrieve contents from source buffers. Following completion of the validation test descriptor, the determined CRC value may be compared against a comparison CRC value. In this example, a retrieve operation of the data mover may be used to retrieve the comparison CRC value from a specified location. For example, the comparison CRC value may be retrieved from a location specified by the validation test descriptor.

FIG. 7 depicts an example execution of multiple determine descriptors followed by execution of a validation value store descriptor. For example, execution of each determine descriptor may include loading a CRC value provided with each determine descriptor into an accumulator for use as a starting value for a CRC value determination over buffer contents specified by each determine descriptor. In this example, a retrieve capability of a data mover may be used to retrieve contents from source buffers. In the example of FIG. 7, the buffer contents and the seed CRC value specified for each determine descriptor may be different. Following completion of the validation value store descriptor, the determined CRC value is stored. For example, the determined CRC value may be stored starting at a location specified by the validation value store descriptor. In this example, a store operation of the data mover may be used to store the CRC value.

FIG. 8 depicts an example execution of a validation value store descriptor followed by at least one determine descriptor and further followed by execution of a validation test descriptor. For example, execution of the validation value store descriptor may include loading a seed CRC value provided with the validation value store descriptor into an accumulator for use as a starting value for a CRC value determination over buffer contents specified by each determine descriptor. Following completion of the validation value store descriptor, the determined CRC value is stored (shown as "stored CRC 1"). For example, the determined CRC value may be stored starting at a location specified by the validation value store descriptor. Unrelated or related operations may follow completion of the validation value store descriptor. Execution of at least one determine descriptor may follow the unrelated operations.

Execution of the first determine descriptor may include loading a seed CRC determination value from a location specified by the first determine descriptor. For example, the seed CRC determination value may have been stored in response to execution of the validation value store descriptor. Execution of each determine descriptor may include loading a CRC value provided with each CRC descriptor into an accumulator for use as a starting value for a CRC value determination over buffer contents specified by each determine descriptor. In this example, the buffer contents and the seed CRC value identified by each determine descriptor may be different. Execution of the validation test descriptor follows execution of the at least one determine descriptor. During execution of the validation test descriptor, the determined CRC value may be compared against a comparison CRC value. For example, the comparison CRC value may be retrieved from a location specified by the validation test descriptor.

Figure 9:
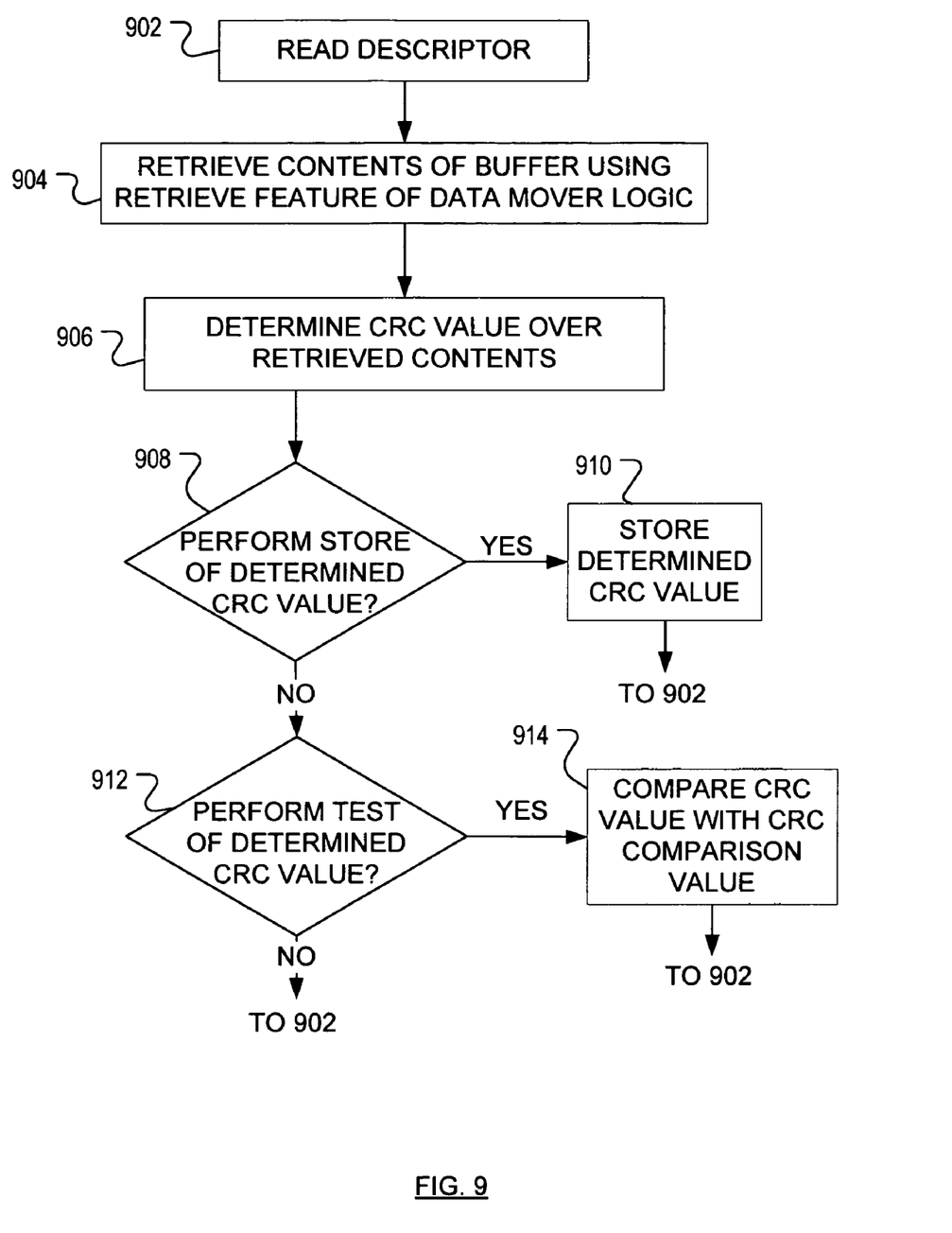
FIG. 9 depicts a flow diagram of an example process that can be used in embodiments of the present invention.

FIG. 9 depicts a flow diagram of an example process 900 that can be used in embodiments of the present invention. For example, process 900 can be used by logic to execute descriptors such as but not limited to integrity validation value determination logic, validity checking decision logic, and/or data mover logic. In block 902, process 900 may read a descriptor. For example, the descriptor may be a validation value store descriptor, determine descriptor, or a validation test descriptor. For example, the descriptor may have a similar format as that described with respect to FIG. 2.

In block 904, process 900 may retrieve contents of a buffer using retrieve capability of data mover logic. For example, the descriptor may specify the location and size of the buffer to retrieve.

In block 906, process 900 may determine a CRC value over retrieved contents. Of course, in other embodiments, integrity validation values other than a CRC value may be determined over a portion of the retrieved contents, such as but not limited to a checksum. The descriptor may provide a seed value to be used as an initial value in a determination of a CRC or other value. The seed value could be default start value or a value from previous integrity value determination operation. For example, in some embodiments, a computation to determine the CRC value may be performed whereas in other embodiments, a look-up-table or other techniques may be used to determine the CRC value.

In block 908, process 900 may determine whether to store the determined CRC value (or other integrity validation value). For example, the descriptor may specify whether to store the determined CRC value. If the descriptor is to be stored, the block 910 follows. If the descriptor is not to be stored, the block 912 follows.

In block 910, process 900 may store the determined CRC value or determined value. In some embodiments, the determined CRC value (or other integrity validation value) may be stored in a location specified by the descriptor. In some embodiments, the determined value is stored at the end of the buffer over which a CRC or other value is determined. In some embodiments, the data mover may be used to store the CRC value or other integrity validation value. Block 902 may follow block 910.

In block 912, process 900 may determine whether to compare the determined CRC value (or other integrity validation value) with a comparison value. For example, the descriptor may specify whether to compare the determined CRC value with a comparison value. If a comparison is to take place, block 914 may follow block 912. If a comparison is not to take place, block 902 may follow block 912.

In block 914, process 900 may compare the determined CRC value (or other integrity validation value) with a comparison value. For example, the comparison value may be identified by the descriptor. In some embodiments, a retrieve operation of the data mover may be used to retrieve the comparison value. Block 902 may follow block 914.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   receiving an instruction to generate an integrity validation value over a portion of contents of a source buffer;
   utilizing a retrieve capability of a data mover to retrieve at least a portion of contents identified in the instruction; and
   determining an integrity validation value over a portion of the source buffer based on the instruction, wherein the instruction further comprises an instruction to compare at least a portion of the determined integrity validation value with a comparison value.

2. The method of claim 1, wherein the instruction further comprises an instruction to store at least a portion of the integrity validation value.

3. The method of claim 2, further comprising:
   storing at least a portion of the integrity validation value using in part the data mover.

4. The method of claim 3, further comprising:
   providing the stored portion of the integrity validation value for transmission with a network protocol unit.

5. The method of claim 1 further comprising:
   retrieving the comparison value using in part the data mover; and
   comparing at least a portion of the determined integrity validation value with the comparison value.

6. The method of claim 5, further comprising:
   selectively making the content available in response to the at least a portion of the determined integrity validation value matching the comparison value; and
   selectively performing error recovery in response to the at least a portion of the determined integrity validation value not matching the comparison value.

7. The method of claim 1, wherein the instruction further specifies an initial integrity validation value capable of use in the determining.

8. The method of claim 1, wherein the data mover comprises a direct memory access (DMA) engine.

9. The method of claim 1, wherein the determining an integrity validation value comprises determining a cyclical redundancy checking value.

10. The method of claim 1, wherein the content comprises a network protocol unit received from a network.

11. An apparatus comprising:
    logic to receive an instruction to generate an integrity validation value over a portion of contents of a source buffer;
    logic to utilize a retrieve capability of a data mover to retrieve at least a portion of contents identified in the instruction; and
    logic to determine an integrity validation value over a portion of the source buffer based on the instruction, wherein the instruction further comprises an instruction to compare at least a portion of the determined integrity validation value with a comparison value.

12. The apparatus of claim 11, wherein the instruction further comprises an instruction to store at least a portion of the integrity validation value.

13. The apparatus of claim 12, further comprising:
    logic to store at least a portion of the integrity validation value using in part the data mover.

14. The apparatus of claim 13, further comprising:
    logic to provide the stored portion of the integrity validation value for transmission with a network protocol unit.

15. The apparatus of claim 11, further comprising:
    logic to retrieve the comparison value using in part the data mover; and
    logic to compare at least a portion of the determined integrity validation value with the comparison value.

16. The apparatus of claim 15, further comprising:
    logic to selectively make the content available in response to the at least a portion of the determined integrity validation value matching the comparison value; and
    logic to selectively perform error recovery in response to the at least a portion of the determined integrity validation value not matching the comparison value.

17. The apparatus of claim 11, wherein the instruction further specifies an initial integrity validation value capable of use by the logic to determine.

18. The apparatus of claim 11, wherein the data mover comprises a direct memory access (DMA) engine.

19. The apparatus of claim 11, wherein the logic to determine an integrity validation value comprises logic to determine a cyclical redundancy checking value.

20. A system comprising:
    a host system comprising a processor, memory, and data mover logic, wherein the host system comprises:
      logic to receive an instruction to generate an integrity validation value over a portion of contents of a source buffer,
      logic to utilize a retrieve capability of the data mover to retrieve at least a portion of contents identified in the instruction, and
      logic to determine an integrity validation value over a portion of the source buffer based on the instruction;
    a network interface capable to transmit and receive network protocol units from a network; and
    a display device.

21. The system of claim 20, wherein the instruction further comprises an instruction to store at least a portion of the integrity validation value.

22. The system of claim 20, wherein the instruction further comprises an instruction to compare at least a portion of the determined integrity validation value with a comparison value.

23. The system of claim 20, wherein the data mover comprises a direct memory access (DMA) engine.

24. The system of claim 20, wherein the logic to determine an integrity validation value comprises logic to determine a cyclical redundancy checking value.

* * * * *